April 5, 1960     M. A. SANT ANGELO     2,932,024
AIRCRAFT NAVIGATION INSTRUMENT
Filed March 29, 1957     3 Sheets-Sheet 1
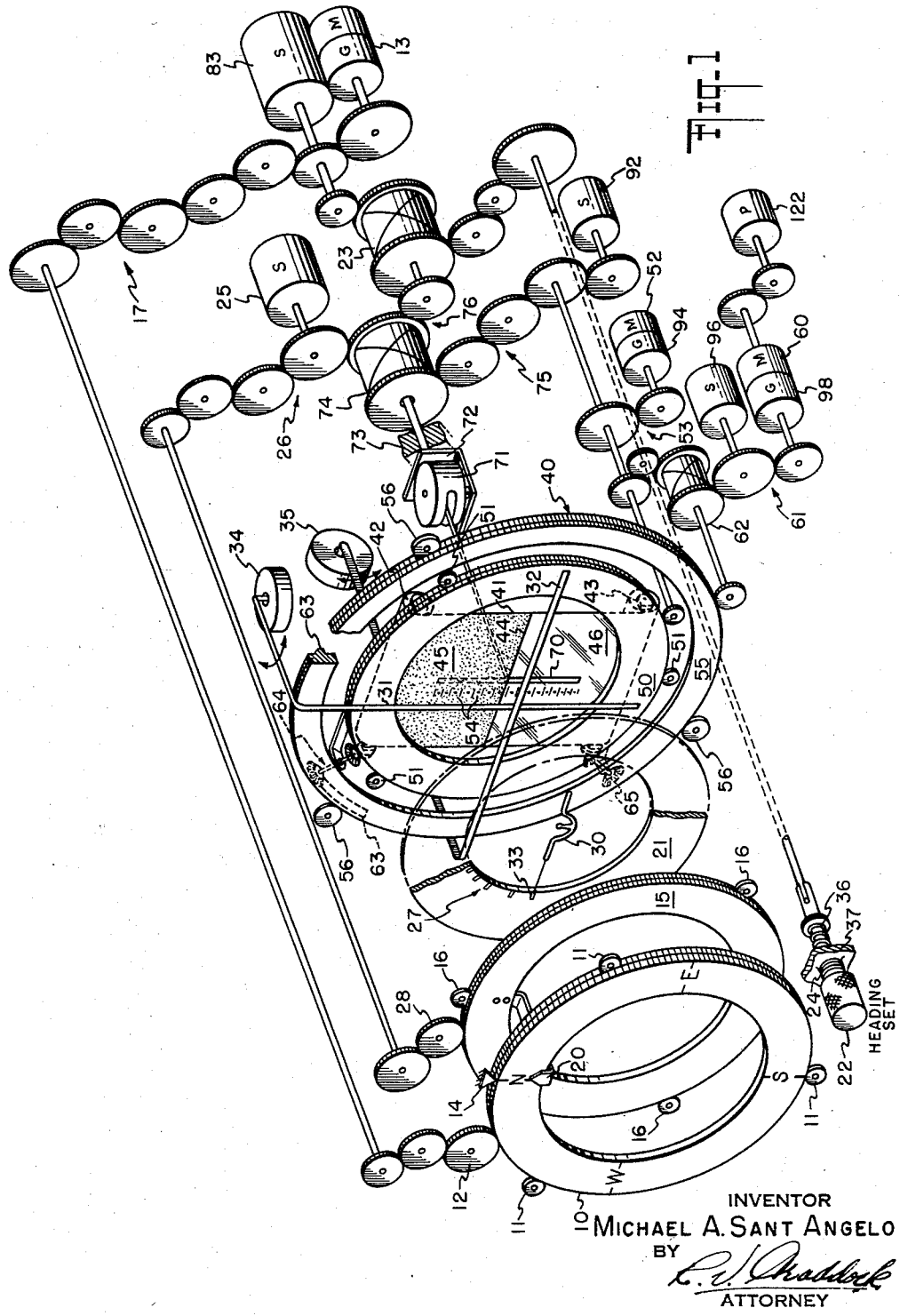
INVENTOR
MICHAEL A. SANT ANGELO
BY
ATTORNEY April 5, 1960    M. A. SANT ANGELO    2,932,024
AIRCRAFT NAVIGATION INSTRUMENT
Filed March 29, 1957    3 Sheets-Sheet 2
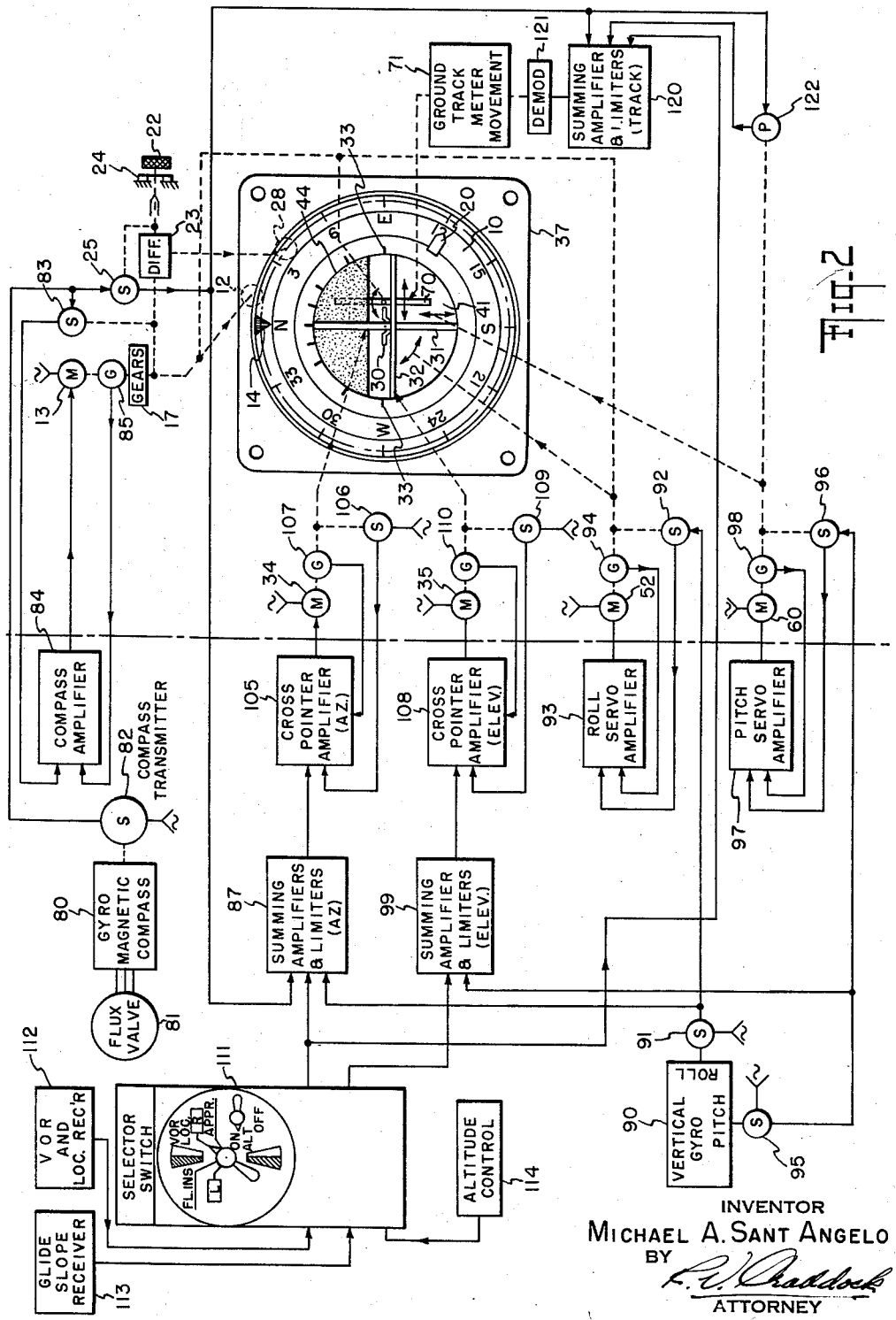
INVENTOR
MICHAEL A. SANT ANGELO
BY
ATTORNEY

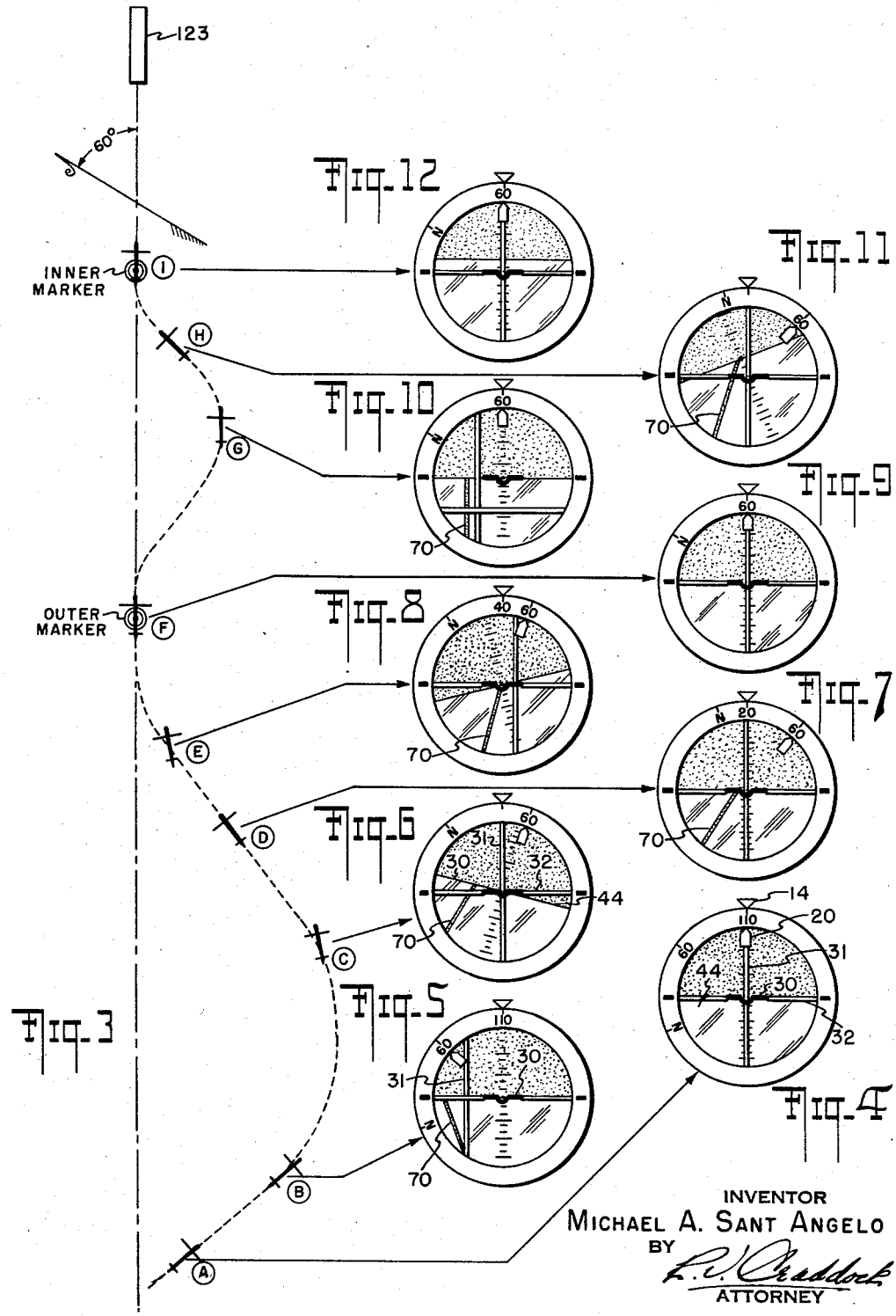

United States Patent Office 2,932,024
Patented Apr. 5, 1960

2,932,024

AIRCRAFT NAVIGATION INSTRUMENT

Michael A. Sant Angelo, Levittown, N.Y., assignor to Sperry Rand Corporation, Great Neck, N.Y., a corporation of Delaware Application March 29, 1957, Serial No. 649,443

31 Claims. (Cl. 343—108)

This invention relates generally to aircraft navigation instruments and more particularly to a navigation instrument for manually piloted aircraft wherein the pilot is relieved of the need of scanning and simultaneously interpreting the information supplied by a number of independent or separately mounted flight instruments. With the instrument of the present invention, the pilot is also relieved of the task of anticipating the amount of control demanded by such interpretation and is yet provided with an indication of the actual amount of control so applied. The instrument also displays to the pilot a pictorial presentation of the position and direction of flight of the aircraft relative to a predetermined or selected ground track defined by a selected radio beam or runway. The instrument of the present invention may be employed as a piloting aid for the manual control of the aircraft by the pilot or as an instrument for enabling the pilot to monitor the control of the aircraft by an automatic pilot.

The present invention relates to a navigation aid for manually piloted aircraft which is an improvement over the instruments set forth in U.S. Patent No. 2,613,352 issued to S. Kellogg 2nd on October 7, 1952 for a Radio Navigation System and patent application Serial No. 421,580 of E. F. Reedy and R. V. Craddock filed on April 7, 1954 for an Aircraft Navigation Instrument (now U.S. Patent No. 2,823,378 issued Feb. 11, 1958) which patents are assigned to the same assignee as the present application.

The primary object of the present invention is to provide a more realistic pictorial presentation of aircraft position and direction of travel with respect to a selected heading than has heretofore been provided by similar instruments.

A further object of the present invention is to provide a more realistic pictorial presentation which allows the pilot to asymptotically approach the desired course while being continuously advised of his attitude and position with respect to said course.

Another object of the present invention is to provide to the pilot by a single instrument, information which has heretofore been unobtainable or required interpretation and correlation of a plurality of separate instruments.

Generally, the instrument of the present invention comprises an instrument housing having a preferably circular opening therein through which the various elements of the instruments may be observed. Viewable through the opening is an annular compass card which is stabilized relative to the magnetic meridian by means of a suitable magnetic compass or slaved gyro magnetic compass. A course selector settable relative to the compass card is provided for setting the magnetic bearing of a selected flight path and once it is set, it moves with the compass card so that the pilot is always informed of the actual heading of the craft relative to the selected path or course. Within the opening defined by the annular compass card there is provided an annular member or ring which is fixed relative to the instrument housing. Within the opening defined by the ring, there is situated the elements of a cross pointer indicator. The cross pointer indicator includes a horizontal bar or pointer and a similar vertical bar or pointer each relatively movable within the opening in the fixed ring. The bars or pointers are displaced in accordance with the outputs of a computer which combine and correlate information regarding the attitude, heading, and radio information in a manner set forth in the above-noted Kellogg Patent No. 2,613,352. As stated, the pilot flies his craft in accordance with the instantaneous deflection of these bars, and by maintaining them in a symmetrical relation, e.g., zeroed, through proper control of the attitude of the craft, the craft will be guided so as to approach and maintain the selected flight path.

Situated directly behind the cross pointer indicator also viewable through the opening defined by the fixed ring is an attitude indicator which comprises, preferably, a flat surface such as a flexible screen stretched between suitable rollers and having an horizon-defining line thereon; the area above the line preferably being opaque and colored in a light shade and the area below the line preferably being transparent to provide a contrasting dark shade when viewed against the dark interior of the instrument. With the craft in straight and level flight, the line will divide the opening defined by the fixed ring into two equal parts. Also provided on the flat surface are a series of markings which may be either short horizontal lines or dots spaced one above the other which when viewed as a whole, define a vertical roll attitude indicating line on the surface of the screen.

Situated directly behind the attitude indicator and viewable through the opening defined by the fixed ring and the transparent area of the attitude indicator is a ground track pointer, preferably of a contrasting light color when viewed against the dark interior of the instrument. The ground track pointer is a substantially straight bar or pointer positionable in translation across the face of the instrument in accordance with signals proportional to the heading error of the craft with respect to a desired heading, the lateral radio displacement from said desired heading and the aforementioned heading error multiplied by the pitch angle of the craft. In a preferred embodiment of the invention, the aforesaid signals are combined and correlated to energize a meter movement that positions the ground track pointer in accordance therewith. The meter movement is itself mounted on a rotatable platform that is stabilized in accordance with signals proportional to the aforementioned heading error and the roll angle of the craft thereby imparting rotational movement to the ground track pointer in accordance therewith. In the normal condition, with the craft in straight and level flight on the desired course the ground track pointer is in a vertical condition at the center of the instrument and is aligned with the vertical pointer of the cross pointer indicator. By this means, the ground track pointer realistically simulates the position of the desired ground track with respect to the craft.

The fixed ring, disposed between the cross pointer and attitude indicators and the annular compass card and heading selector, has attached thereto a reference index, representative of the craft, and against which all of the indicators may conveniently be read. This reference index is preferably located at the center of the opening defined by the fixed ring so that when the craft is proceeding along the desired or selected flight path, the ground track pointer, the cross pointer indicator, roll attitude indicator, heading selector, and selected compass card calibration will all lie in relative alignment. If the craft deviates from the desired course, the elements of the instrument will no longer lie in alignment thereby quickly informing the pilot of such deviation, and by following the dictates of the cross pointer indicator, the pilot may asymptotically approach the desired course while being continuously advised of his attitude and position with respect to said course.

Other objects and advantages of the present invention not at this time particularly enumerated will become apparent as a description of the preferred embodiment of the present invention proceeds, especially when considered with respect to the accompanying drawings wherein like reference characters indicate like elements, wherein:

Fig. 1 is a perspective exploded schematic view of a preferred embodiment of the instrument of the present invention;

Fig. 2 is a schematic representation of the indicator of the present invention together with the data sources and means for operating the same;

Fig. 3 is a diagram illustrating an arbitrary flight path which may be pursued by a craft when seeking the localizer and glide slope beams of an instrument landing system;

Figs. 4 to 12 inclusive, are views of the instrument as seen by the pilot when the craft is at various positions on the flight path illustrated in the diagram of Fig. 3.

The instrument of Fig. 1 has a housing, which for purposes of clarity is not shown, that forms the supporting and covering structure for the various indicating and actuating elements. The housing has a transparent opening through which the various indicating elements are viewable preferably in the order to be described.

The compass card 10 of the instrument comprises a flat, annular member rotatably supported within the housing 37 by means of flat rollers 11. Around the periphery of the compass card 10 are gear teeth engaged by the driving gear 12 of gearing 17 that provides a positioning means for the card. The gear teeth on the card 10 have a peripheral groove into which the rollers 11 fit. Compass card 10 is stabilized relative to magnetic north through compass card servomotor 13 in a manner to be hereinafter more fully described. The card 10 is provided with the usual compass calibrations so that the heading of the craft may be determined by the calibration appearing at a reference index or lubber line 14 fixed relative to the instrument housing.

Directly behind compass card 10 is a similar annular member 15 which is also rotatably mounted on the instrument housing by means of similar rotatably mounted support rollers 16, the rollers 16 engaging a peripheral groove in the gear teeth of the member 15. Member 15 carries a heading selector member or cursor 20 which extends through an annular opening defined by compass card 10 and a fixed annular member 21 so that it is visible on the face of the instrument.

The means for setting the heading selector 20 relative to the compass card 10 is conventional. As shown, a heading set knob 22 is provided which, when pulled outwardly and rotated, for example, drives one input member of differential 23. During a heading setting operation the compass card 10 can be considered as being fixed (through a gear train and the compass card servomotor), and therefore heading selector 20 is rotatable relative to the card. When the knob 22 is released, it is urged inwardly by a conventional resilient means 36 thereby locking the knob 22 to the housing 37 by a suitable friction clutch connection 24. When the knob 22 is so locked, the input member of differential 23 is also locked or fixed so that compass card 10 and heading selector 20 will rotate together. The gear ratio is so selected that a 1:1 ratio exists between compass card 10 and heading selector 20. When heading selector 20 is rotated to a new position, that is, to a new selected heading, a signal voltage transmitter 25, such as a synchro control transformer, for example, is also rotated through suitable gearing 26. The gear ratio of gearing 26 is so selected that the transmitter will be rotated at a 1:1 ratio with the compass card 10. Therefore, a signal will be generated at transmitter 25 which is proportional to the displacement of the heading selector 20 and hence, proportional to the difference between the actual heading of the craft and the selected heading, the heading error. The signal from control transformer 25 is used in the operation of the instrument in a manner to be hereinafter more fully described.

As above stated, the instrument of the present invention is provided with an annular ring or craft reference supporting member 21 which is positioned within the opening defined by annular compass card 10 and behind member 15. Ring 21 is supported in the instrument housing 37 in fixed relation therewith by suitable means not shown. At the upper portion of ring 21 are generally radially extending reference marks 27 which serve as the fixed roll reference index. A symbolic miniature airplane reference index 30 that is attached to ring 21 is provided at the center of the indicator face and may be used as a common fixed reference index for all of the moving elements of the instrument.

Viewable through the opening defined by annular ring 21 are a pair of preferably mutually perpendicular maneuver command indicators or guidance indicator members or pointers 31 and 32, which pointers are normally symmetrically disposed in the opening when the craft is on or correctly approaching a selected course. Under the above conditions, the vertical or azimuth pointer 31 is in its zero position, aligned with the center of the common index 30, while the horizontal or pitch pointer 32 in its zero position, is aligned with indices 33 suitably inscribed on or connected to fixed ring 21 and is also aligned with the laterally extending wings of the common index 30.

For purposes of simplicity in the embodiment illustrated in Fig. 1, the azimuth and pitch pointers 31 and 32 are shown arranged to move across the face of the instrument about axes defined by azimuth control motor or meter movement 34 and pitch control motor or meter movement 35, respectively. If it is desired to move the pointers 31 and 32 parallel to the face of the instrument to avoid parallax errors, the rotation imparted by the control motors 34 and 35, respectively, may be transformed into translation by means of the epicyclic gear arrangement shown in patent application Serial No. 436,169 of E. B. Hammond, Jr. for Aircraft Navigation Instrument filed June 11, 1954, now U.S. Patent No. 2,782,395, issued February 19, 1957, and assigned to the same assignee as the present invention. Azimuth and pitch control motors 34 and 35 drive pointers 31 and 32 in accordance with electrical signals derived and correlated in a manner to be hereinafter more fully described.

Also viewable through the opening defined by annular member 21 is a horizon or roll and pitch indicator 40 forming a movable background for the guidance indicators 31 and 32. Pitch and roll indicator 40 is generally similar to the type disclosed in the aforementioned application of E. B. Hammond, Jr., Serial No. 436,169, with the exceptions as hereinafter noted. As shown in Fig. 1, the roll and pitch indicating number 40 comprises a broad thin, flexible belt-like screen or element 41 reeved over a pair of spaced rollers 42 and 43. The length of the screen member and the separation of the rollers are so selected that the screen remains in a smooth, taut condition. The screen 41 is movable in a planar fashion crosswise of the opening defined by the annular member 21 by means to be described and with the broad, flat face thereof presented toward the viewer. Screen 41 is provided with a demarcation or horizon line 44, which, in its normal position, divides the opening defined by annular ring 21 into two substantially equal sectors. The sector above the demarcation line 44 is preferably opaque and of a light color to form a sky-simulating portion 45 while the sector therebelow is preferably transparent or partially cut-out to form a ground-simulating portion 46 when viewed against the dark interior of the instrument.

Rollers 42 and 43 and screen 41 are pivotally supported on a roll ring 50, which ring in turn is pivotally supported in the instrument housing by suitable bearings 51 for rotation about the longitudinal axis of the instrument, i.e., the roll axis of the aircraft. The roll ring 50 is rotated by means of a roll servomotor 52 coupled with roll ring 50 through suitable gearing 53 that meshes with the peripheral gear teeth on ring 50. Roll motor 52 is actuated by signals from a suitable vertical reference such as a vertical gyro as described below. In this manner, horizon demarcation line 44, on the screen member 41, is stabilized in roll, i.e., it is maintained substantially parallel to the earth's horizon.

In some applications of the present invention, it may be desirable to change the sensing of the bank attitude indication. In such cases, the polarity of the signal controlling the roll servomotor 52 may be made such that, for example, upon rolling or banking of the craft to the left, the horizon line 44 and the meridian line 54, defined by a series of short lines and dots as will be described, will tilt to the left, i.e., in the same direction as the bank. Such sensing will indicate to the pilot the bank attitude of the craft relative to the craft rather than to the earth's horizon. This sensing may be advantageous in the present application inasmuch as, for example, if the azimuth pointer 31 should be displaced to the left of its normally centered or zero position, the pilot will, in following the commands of the indicator, turn to the left by initiating a left bank. In such cases, the horizon line 44 and meridian line 54 will be tilted toward the azimuth pointer 31, indicating to the pilot that his craft is banked in a direction to reduce the displacement of pointer 31 towards its centered or zero position.

In addition to the horizon line 44, there may be provided on the screen member 41 a pitch scale which may comprise a series of short lines and dots 54 spaced along a central longitudinal axis of screen 41 which is perpendicularly disposed relative to the horizon line 44. This series of lines and dots, when viewed as a whole, define a vertical line or meridian line on the surface of the screen 41. The vertical line which is stabilized in roll is used not only as a pitch scale but also as a roll reference line which is referenced to the roll reference index 27 on the annular ring 21.

For moving the horizon line 44 up and down as the craft's pitch attitude changes, there is provided a pitch ring 55 concentrically and rotatably supported with respect to the roll ring 50 in the instrument housing by suitable bearings 56. The pitch ring 55 is rotatable about the longitudinal axis of the instrument by means of a pitch servomotor 60 coupled thereto through suitable gearing 61 and differential 62 that meshes with the peripheral gear teeth on ring 55. Pitch servomotor 60 is actuated by signals from a suitable vertical reference, such as a vertical gyro to be described. The rotation of the pitch ring 55 is transformed into translation of the horizon line 44 by a suitable coupling means between the ring 55 and the rollers 42 and 43 that positions the screen 41. In the preferred embodiment of Fig. 1, the coupling means comprises a bevel gear 63 circumferentially mounted on one side of pitch ring 55 that meshes with suitable bevel gear trains 64 and 65 to drive rollers 42 and 43, respectively. This mechanism, described immediately above, stabilizes horizon line 44 on the screen 41 in pitch.

A rotation of pitch ring 55 relative to roll ring 50 causes, through gears 63, 64 and 65, a movement of screen 41 in pitch. If there is a change in roll, but there is no change in pitch, rings 50 and 55 are rotated together by roll servomotor 52 through gearing 53 and differential 62, respectively. By this compensating means, the relative movement of roll ring 50 with respect to pitch ring 55 during roll maneuvers is prevented thereby eliminating errors in the position of screen 41 in pitch caused by roll. If there is a change in pitch in addition to roll, pitch servomotor 60 gives an additional rotation to pitch ring 55 though differential 62 causing a movement of screen 41 in pitch.

Viewable through the opening defined by annular member 21 and by the transparent ground simulating portion 46 of screen 41 is a positionable pointer or element 70 that simulates a predetermined ground track or course which the pilot desires to fly or a runway on which he desires to land. The ground track pointer 70 is mounted behind the screen 41 with the transparent portion 46 thereof providing a movable foreground through which a portion of the pointer 70 is viewable against the dark interior of the instrument. Preferably, the ground track pointer 70 is light colored, being a contrasting shade with respect to the other movable elements to be readily distinguishable therefrom. The length of the pointer 70 is preferably at least equal to the diameter of the opening defined by annular ring 21, but not long enough to interfere with the operation of rollers 42 and 43. The pointer 70 is normally symmetrically disposed in a vertical condition within the opening defined by annular ring 21 and aligned with the center of the common index 30 when the craft is flying the desired ground track or course with wings level.

The ground track pointer 70 is arranged to move substantially in translation across the face of the instrument about an axis defined by meter movement 71 or other suitable motive means and to rotate about the longitudinal axis of the instrument by means to be described. Meter movement 71 drives pointer 70 in accordance with electrical signals derived and correlated in a manner to be hereinafter more fully described. The rotatory movement of the pointer 70 is imparted thereto by mounting the meter movement 71 on a suitable mounting means such as platform 72 which itself is rotatably supported within the housing by suitable bearings 73 about the longitudinal axis of the instrument. The platform 72 is connected to and driven by the output of differential 74 through an angle equivalent to the roll angle, plus the heading error angle of the craft. This is achieved by supplying the necessary roll information from roll servomotor 52 to one input of differential 74 by means of suitable gearing 75. The necessary heading error is supplied to the other input of differential 74 through suitable gearing 76 from the output of differential 23 which, as previously explained, combines the actual heading with the selected heading to produce an output equivalent to heading error. By this means, the meter movement 71 is stabilized as a function of the roll attitude of the craft and the heading error with respect to a desired ground track and consequently actuates the pointer 70 in accordance therewith, as well as other signals to be described.

In Fig. 2 there is illustrated schematically the complete control system for the embodiment of the navigation instrument of the present invention illustrated in Fig. 1. As shown in Fig. 2, the signals that control the elements which are moved relative to the common reference index 30 are initially generated by primary craft references such as radio navigation aids and craft attitude references. Compass card 10 is stabilized relative to a fixed direction in space, such as the magnetic meridian defined by a suitable magnetic compass which may be, for example, a gyromagnetic compass 80 controlled from a magnetic direction reference such as flux valve 81. Such a gyromagnetic compass system is disclosed more fully in U.S. Patent No. 2,357,319, issued September 5, 1944 to O. E. Esval, et al., assigned to the same assignee as the present application. Attached to the gyromagnetic compass 80 is a compass transmitter 82 such as, for example, a synchro transmitter which supplies a signal corresponding to the azimuthal position of the craft's fore and aft axis with respect to the magnetic meridan. Synchro receiver or control transformer 83 electrically connected with transmitter 82 supplies as its output a signal corresponding to the difference in position of the compass card 10 and the actual position of the craft's fore and aft axis, i.e., the heading of the craft relative to the magnetic meridian, which signal is amplified by means of suitable compass amplifier 84 to actuate compass card servomotor 13 in such a direction and to such an extent as to reduce the signal from control transformer 83 to zero, thereby establishing correspondence between the position of the compass card 10 and the magnetic meridian defined by the gyromagnetic compass 80. A suitable speed generator 85, may be employed in a conventional manner for stabilizing the compass card servo loop. Thus, the compass calibration adjacent the lubber line 14 indicates the heading of the aircraft relative to the magnetic north and any change in heading of the craft will be indicated by rotation of the compass card relative to the lubber line 14.

Heading selector knob 22 is provided for manually establishing (i.e., setting) the magnetic bearing of a selected course and for generating a signal proportional to the difference between the actual aircraft heading and the selected aircraft heading. When the selector knob 22 is pulled out and rotated to a position corresponding to a selected heading, the rotor of control transformer 25 is rotated relative to its stator, which is fixed to the craft, through one input of differential 23. Since the other input of differential 23 can be considered as being fixed due to the gearing 17 between compass card servomotor 13 and compass card 10, the output of differential 23 rotates gear 28 which, in turn, positions the heading selector 20 in accordance with rotation of heading selector knob 22. Furthermore, since the stator of control transformer 25 is also connected to compass transmitter 82, a signal voltage proportional to the difference between the actual course or heading of the aircraft and the selected course or heading is generated in the rotor of control transformer 25. Thus, there is provided a heading error signal proportional to the difference between the actual aircraft heading and the desired aircraft heading, this signal being applied as one of the inputs to summing amplifier and limiter 87 which controls the position of azimuth pointer 31 relative to the common reference index 30 in a manner to be described below.

As described above, the shade-like horizon indicator element 41 is positioned in accordance with the roll attitude of the craft by rotating roll ring 50 through roll servomotor 52. For this purpose, a conventional servo loop between a vertical reference such as a vertical gyro 90 and the roll ring 50 is provided. Attached to the roll axis of the vertical gyro 90 is a synchro transmitter 91 for supplying a signal proportional to the roll attitude of the craft relative to the vertical established by the gyro, this signal being compared in control transformer 92 with the position of the roll ring 50. If any error exists between roll ring 50 and the craft's roll attitude established by vertical gyro 90, an output signal will be generated at control transformer 92 and applied to a roll servo amplifier 93, the output of which drives motor 52 in such a direction and in an amount as to reduce the error signal to zero, thereby establishing correspondence between the roll ring 50 and the vertical established by gyro 90. Again, a suitable speed generator 94 may be provided for stabilizing this servo loop. The output from the synchro 91 corresponding to the roll angle of the craft relative to vertical is applied as another input to the summing amplifier and limiter 87 for further controlling the position of azimuth pointer 31 relative to the same craft reference index 30 against which the horizon line 44 on screen 41 is also read.

As described, the horizon indicator 41 is positioned in pitch by relative rotation of pitch ring 55, and roll ring 50 as accomplished through pitch servomotor 60 and gearing 61 including differential 62. Pitch servomotor 60 is actuated in accordance with a signal corresponding to the difference between the position of pitch ring 55 and the actual pitch of the craft as determined by vertical gyro 90 through a similar servo loop including control synchro transmitter 95 on the pitch axis of gyro 90, control transformer 96, and pitch servo amplifier 97; a suitable speed generator 98 being again provided for stabilization purposes. The signal from synchro 95 corresponding to the pitch attitude of the craft is also supplied to summing amplifier and limiter 99 for controlling in part the pitch pointer 32.

Azimuth and pitch pointers 31 and 32 are positioned in accordance with the craft's displacement and attitude relative to the predetermined flight path in the same manner as the cross pointers described in the above noted Kellogg Patent No. 2,613,352. The azimuth pointer 31 is positioned by a servo loop including servomotor 34 controlled in accordance with the output of azimuth cross pointer amplifier 105. One of the inputs thereof is an output signal from summing amplifier and limiter 87 and another input is a signal corresponding to the position of the azimuth pointer 31 as represented by a position feedback signal from transmitter 106. Also, the operation of the servomotor 34 may be stabilized by means of speed generator 107, which feeds a signal into amplifier 105, as in conventional servo systems. Elevation or pitch pointer 32 is likewise positioned by a servo loop including servomotor 35 controlled in accordance with the output of elevation cross pointer amplifier 108. Again, one of the inputs of this amplifier is the output of summing amplifier and limiter 99 and another input is a position feedback signal corresponding to the position of the pointer 32 as represented by signal transmitter 109. Again, a stabilization voltage may be supplied to amplifier 108 by speed generator 110. Alternatively, azimuth and pitch pointers 31 and 32 may be positioned by meter movements in lieu of servomotors 34 and 35, respectively.

As explained more fully in the above-noted Kellogg Patent No. 2,613,352, a suitable selector switch 111 is provided for the purpose of selecting a desired flight plan. An indexed knob indicates the particular flight plan chosen and, through switches controlled by the knob, circuits are established for supplying correct signals in their proper relative polarity sense as inputs to the summing amplifiers 87, 99 and 120, the latter to be described. The signals are supplied to the selector switch 111 by suitable conventional means such as VHF Omni Range (VOR) and Localizer receiver 112, glide slope receiver 113, and altitude control 114. A change of flight plan can be introduced at any time by manipulation of the switch. The selector switch 111 enables the pilot to choose the following flight facilities; Flight Instruments, Approach, VOR, Localizer Beam (LOC), In-bound or Out-bound Sensing (blue right or blue left), and Altitude Control. Thus, the signals supplied as inputs to the summing amplifier 87 for controlling the azimuth pointer 31 are, depending upon the flight plan selected, a signal corresponding to the lateral displacement of the aircraft from a selected radio beam, a signal proportional to the difference between the actual craft heading and a desired selected craft heading (when radio signals are used the selected heading is the bearing of the radio beam), and a signal proportional to the roll attitude of the craft. Likewise, the signals supplied as inputs to the summing amplifier 99 for controlling the horizontal or elevation pointer 32 includes a signal corresponding to the vertical displacement of the craft from a selected radio beam, such as, for example, a glide slope beam, or a signal corresponding to vertical displacement from a selected altitude, and a signal proportional to the pitch attitude of the craft.

As previously described, the platform 71 shown in Fig. 1 is stabilized as a function of the roll altitude of the craft and the heading error with respect to a desired ground track. By virtue of being mounted on the platform 72, the meter movement 71 imparts rotary motion to the ground track pointer 70 equivalent to the aforesaid roll attitude and heading error signals. Referring again to Fig. 2, the ground track pointer 70 is also positioned substantially in translation across the face of the instrument about an axis defined by the meter movement 71 as a function of heading error, radio deviation and heading error multiplied by the pitch attitude of the craft with respect to a selected or predetermined ground track. The aforesaid combination of signals supplied to actuate the pointer 70 provides a pointer means variably positionable over the ground-simulating portion of the instrument for indicating the position of the aircraft with respect to a predetermined or selected ground track. The meter movement 71 is responsive to the output of summing amplifier 120 after the output has been demodulated in phase-sensitive demodulator 121. One of the inputs to the amplifier 120 is a signal from control transformer 25 proportional to heading error. The heading error signal is also applied to potentiometer 122 which has a slider arm positioned by motor 60 as a function of pitch. The output of potentiometer 122 corresponds to heading error multiplied by pitch and is applied as another input to amplifier 120. An additional input to amplifier 120 is a signal corresponding to the lateral radio deviation from a desired radio beam supplied from the output of selector switch 111.

Thus, the signals supplied as inputs to the summing amplifier 120 for actuating the meter movement 71 are, depending upon the flight plan selected, a signal corresponding to the lateral displacement of the aircraft from a selected radio beam, a signal proportional to the difference between the actual craft heading and a desired selected heading, i.e. heading error (when no radio signals are used the selected heading is the bearing of the radio beam), and a signal proportional to the aforementioned heading error multiplied by the pitch attitude angle. The ground track pointer 70 therefore is positionably controlled in accordance with roll and heading error signals due to the stabilized mounting arrangement and in accordance with heading error, heading error multiplied by pitch and radio deviation signals due to the meter movement actuation. The ground track pointer 70 is positionably controlled in accordance with the aforesaid combination of signals to provide an index that accurately depicts the desired ground track and one which disappears at the proper location on the horizon line 44 irrespective of roll and pitch maneuvers.

The manner in which these signals are combined and correlated to operate the ground track, azimuth and pitch pointers 70, 31 and 32 and the manner in which the movable indicating elements of the indicator of the present invention are operated therewith may best be understood by considering the operation of the instrument during a typical flight procedure in which the craft is controlled in accordance with the indications presented in approaching and maintaining a selected radio heading. Such a flight procedure is illustrated in Fig. 3, which shows the track of an aircraft as it aproaches and maintains an Instrument Landing System (I.L.S.) localizer radio beam and glide slope radio beam. Figs. 4 through 12 show the indications presented by the instrument at various points, A through I, during this flight procedure.

In the flight procedure illustrated in Fig. 3, let us assume the craft is at point A and proceeding on flight instruments along a preselected course having a magnetic bearing of 110°. The indication of the instrument provided by the present invention under this flight condition is illustrated in Fig. 4 and it is seen that the heading selector 20, azimuth pointer 31, the present craft heading on compass card 10, meridian line 54 providing the roll reference and the ground track pointer 70 are all aligned with craft reference index 30 and defines a line corresponding to a line in space along which the craft is proceeding. At point B, assume the pilot desires to approach and maintain an I.L.S. radio beam having a bearing of 60° magnetic. The pilot sets the selector switch 111 to the localizer (LOC) position thereby supplying a signal from radio receiver 112 proportional to the lateral displacement of the craft from the localizer radio beam to summing amplifiers 87 and 120. Also, the pilot adjusts heading selector 20 through knob 22 (as shown in Fig. 1) so that the apex thereof lies adjacent compass card 10. Such manual setting of the bearing of the radio beam through differential 23 generates a signal at control transformer 25 proportional to the difference between the present heading of the craft and the bearing of the radio beam. Upon completion of these settings, the azimuth pointer servo loop is controlled by a limited signal corresponding to the algebraic sum of a signal proportional to the heading difference between the selected craft heading and the bearing of the radio course and a signal proportional to the lateral displacement of the craft from the radio beam. Thus, the azimuth pointer 31 is displaced to the left of craft index 30 in accordance therewith. The aforementioned heading error signal from control transformer is also applied to rotate the platform 72 of Fig. 1 and to summing amplifier 120 to actuate meter movement 71. The ground track pointer 70 is then controlled by a limited signal corresponding to the algebraic sum of a signal proportional to the heading error and a signal proportional to the lateral displacement of the craft from the radio beam. Thus, ground track pointer 70 is displaced and slanted to the left of craft index 30 in accordance therewith to indicate the craft is offset with respect to and, flying away from the desired ground track. At point B then, the indicator will appear as illustrated in Fig. 5, i.e., the azimuth pointer 31 and ground track pointer 70 both command a left turn.

Following this indicated command, the pilot banks the craft to the left thereby causing the craft to turn towards the radio beam. As the craft banks, a roll signal is generated at the vertical gyro 90 which generates a signal proportional to the bank angle, this bank angle signal being applied as a third input to summing amplifier 87 and as a second input to platform 72. As explained in the above-mentioned Kellogg patent, the combined displacement and heading signals, preferably limited, are matched with the bank signal so that when the signal corresponding to the bank angle of the craft exactly cancels the same, the output of summing amplifier 87 therefore will reduce to zero, thereby immediately centering or zeroing the azimuth pointer 31 with reference to the index 30. Thus, although the craft is still displaced from the radio course, the pilot is advised, through the zeroing of azimuth pointer 31, that he is maneuvering or proceeding along a course which will eventually bring him to the desired radio course. Since the roll or bank signal is also supplied to the roll indicator servo loop to thereby stabilize horizon line 44 and meridian line 54, the pilot is advised of his exact roll error signals. With the roll signal becoming greater and the heading error signal becoming less as the craft turns towards the beam, the pointer 70 will be rotatably positioned in a clockwise direction as viewed in Fig. 6. The meter movement 71 is actuated by signals from summing amplifier 120 which are the algebraic summation of heading error and lateral radio displacement to position pointer 70 laterally across the face of the instrument. Since the craft is turning towards the beam, both signals are becoming less and the pointer 70 is positioned in translation towards craft reference index 30. The indication provided thus shows the reference craft index 30 flying towards the ground track pointer 70 in such a manner as to make an asymptotic approach to the desired ground track as indicated by the symmetrically disposed cross pointers 31 and 32.

As the heading of the craft changes during the turn from B to C in Fig. 3, the heading difference signal will go to zero when the craft is on a 60° heading and will reverse in polarity as the heading of the craft continues to swing to the left. When the heading signal builds up in the opposite polarity, a point will be reached where the heading signal is equal and opposite to the limited radio displacement signal. Under this signal condition the roll or bank signal will predominate and therefore the pilot must roll out of the turn to reduce the bank angle signal in order to maintain the azimuth pointer 31 on the craft reference index 30. Such a reduction of bank angle will continue until the heading difference signal exactly equals the radio displacement signal. The above condition obtains when the craft is at point D, and the indicator under these conditions will appear as illustrated in Fig. 7. Again, the horizon indicator 40 will inform the pilot that he has, in fact, rolled out of turn and that he is flying a straight and level course.

In Fig. 7, the reference craft index 30 is shown to be approaching the ground track pointer 70 at a larger angle than shown in Fig. 6 due to the greater heading error of the craft with respect to the beam. However, due to the smaller value of the lateral radio displacement signal the ground track pointer is indicated as being closer to the craft reference index 30. There is no roll signal applied to the platform 72 or to the summing amplifier 120 since at position D the craft is in straight and level flight.

The craft will now proceed along a straight line course determined by a limited radio displacement signal which is exactly equal and opposite to the heading difference signal. However, at point E along the course illustrated in Fig. 3, the radio displacement signal will drop below the predetermined limit and thus the heading difference signal will predominate and cause azimuth pointer 31 to move to the right as illustrated in Fig. 8. The ground track pointer 70 is disposed in relation to the craft reference index 30 due to the predominating heading error signal such that the pointer 70 is still indicated as being to the left of index 30 and being approached asymptotically.

The pilot returns azimuth pointer 31 to reference 30 by banking to the right. The magnitude of the bank angle will depend on the magnitude of the difference between the diminished radio displacement signal and the heading difference signal, and, as above, the magnitude of the bank angle will be indicated to the pilot by the horizon line 44 and meridian line 54. As the craft turns to the right in response to the bank, compass card 10 will rotate to the left, indicating the craft is approaching the 60° bearing of the radio beam. As the craft rolls to the right and a right turn takes place, the heading difference signal also begins to decrease. As the approach continues and the radio displacement signal decreases, the heading difference signal also decreases due to turning of the craft in response to its bank angle. Furthermore, as the radio displacement signal approaches zero, the heading displacement signal must also approach zero. This is accomplished by reducing the bank angle and hence reducing the turning rate of the craft. When the craft is on the radio beam and aligned with it in straight and level flight, all signals will be reduced to zero and the indicator will appear as illustrated in Fig. 9 wherein it will be noted that the roll reference defined by the meridian line 54, the heading selector 20, azimuth point 31 and ground track pointer 70 are all mutually aligned with the common craft reference 30.

During the entire approach procedure above described, the pilot is informed, by movements of heading selector 20 and horizon indicator 40, of the magnitude and sense of the control parameters heading and bank attitude which operate to control the ground track pointer 70 and the azimuth pointer 31. The magnitude and sense of these control parameters is indicated in the instrument of the present invention by movement of elements responsive thereto relative to the same common craft reference index 30 to which the pointers 70 and 31 controlled thereby are also referred.

During the approach of the craft through positions A to F to the radio beam as described above, it has been assumed that the craft has been flying at a constant altitude as determined by an altitude deviation signal generated by altitude control 114 applied to summing amplifier 99. The manner in which the aircraft is controlled in pitch in response to the altitude signal and the pitch attitude signal supplied by vertical gyro 90 is similar to that described in the above mentioned Kellogg patent with regard to the operation of the cross pointers 31 and 32, and a detailed description is not deemed necessary.

At point F, it is assumed that the aircraft is about to make an approach to runway 123 along a suitable glide slope beam whose altitude scale is indicated at the left of Fig. 3 between the outer marker and the inner marker. The pilot sets the selector switch 111 to the "approach" position. In the approach position of the knob, the signals employed in the localizer (LOC) position are also used as more fully described in the aforementioned Kellogg patent. However, the altitude control signal is replaced by a glide slope signal. At point F, the aircraft is flying straight and level at the prescribed altitude over the outer marker. At point G, the aircraft has been blown upward and to the right of the runway heading while remaining parallel thereto but at a higher altitude than the glide slope beam. As seen in Fig. 10, the pitch pointer 32 is displaced downwardly from the craft reference index 30 indicating the craft is above the desired altitude and commanding a pitch down attitude. Due to the lateral radio displacement signal, both the azimuth pointer 31 and the ground track pointer 70 are displaced to the left of the craft index 30 and parallel thereto commanding a left bank toward the desired glide slope.

At point H, the plane is rolling to the left and diving towards the glide slope as previously commanded by Fig. 10. The craft is in the proper attitude for an asymptotic approach to the glide slope as previously explained and indicated by the symmetrically disposed cross pointers 31 and 32. The horizon line 44 and meridian line 54 indicate the plane is banking and diving. The ground track pointer 70 is displaced to the left of the reference aircraft 30 and at an angle thereto such that the reference aircraft 30 is indicated as flying towards the desired ground track.

At point I, the craft has returned to the glide slope over the inner marker and is at the proper altitude, flying with approximately a 2½° nose down attitude and aligned with the glide slope with wings level. Fig. 12 indicates the plane on the glide slope with a 2½° pitch down attitude as indicated by the horizon line 44 above the reference craft 30 and with the cross pointers symmetrically disposed with respect to the reference index 30 and ground track pointer 70 with azimuth pointer 31.

The pilot is continuously informed of the relative position of the desired ground track with respect to the craft by viewing the pointer 70 with respect to common index 30. By means of cross pointers 31 and 32 used in conjunction with pointer 70, the pilot is advised of the proper flight path to approach the desired ground track asymptotically and is also advised of the exact relationship of the craft with respect thereto by referencing the pointers 70, 31 and 32 to the common index 30. Thus, as the heading of the craft changes, the ground track pointer 70 realistically displays an actual track on the ground. Similarly, as the horizon shade 41 moves in pitch, the ground track pointer 70 will move also, so it continues to disappear at the same point on the horizon line 44.

Although the invention has been described utilizing a flat screen type artificial horizon presentation, it is to be understood that the invention also contemplates the use of a hollow spherical horizon which has the upper half of the sphere an opaque and light colored area while the lower half of the sphere is transparent, thereby providing a dark area when viewed against the interior of the instrument. In the latter embodiment, it would be preferable to have the pointer elements curved in order to match more accurately against the spherical surface of the artificial horizon to minimize parallax errors.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A navigation instrument for aircraft comprising a horizon indicator having sky-simulating and ground- simulating portions, means for stabilizing said horizon indicator in pitch and roll whereby to indicate pitch and roll attitude of said aircraft, pointer means variably positionable over said ground-simulating portion for indicating the position of said aircraft with respect to a predetermined ground track, and means responsive to the position of said aircraft with respect to said ground track for actuating said pointer means.

2. A navigation system for aircraft comprising a horizon indicator means having sky and ground portions, means for stabilizing said horizon indicator means in pitch and roll whereby to indicate the pitch and roll attitude of said craft, a single pointer means variably positionable over said ground portions for indicating the position of said craft with respect to a selected ground track, and means for providing a signal in accordance with the rate of approach of said craft to said ground track for actuating said pointer means.

3. A navigation instrument for aircraft comprising a reference index, a horizon indicator having sky and ground portions, means for stabilizing said horizon indicator in pitch and roll whereby to indicate pitch and roll attitude of said aircraft, pointer means variably positionable over said ground portion for indicating the position of said aircraft with respect to a predetermined ground track as a deflection of said pointer means from said reference index, and means responsive to the position of said aircraft with respect to said ground track for actuating said pointer means.

4. A navigation instrument for aircraft as claimed in claim 3 in which the pointer means is stabilzed as a function of roll and heading error.

5. A navigation instrument for aircraft of the type claimed in claim 4 in which the means for actuating said pointer means includes motive means actuated by the algebraic summation of signals which are functions respectively of heading error, heading error multiplied by pitch, and radio deviation with respect to said ground track.

6. A navigation instrument for aircraft of the type claimed in claim 3 in which the means for actuating said pointer means comprises a motive means actuated by signals which are a function of heading error, heading error multiplied by the pitch attitude of the craft, and radio deviation with respect to said ground track wherein said motive means is itself stabilized as a function of the roll attitude of the craft and heading error with respect to said ground track.

7. A navigation instrument for aircraft comprising a reference index, a horizon indicator having sky-simulating and ground-simulating portions, means for stabilizing said horizon indicator in pitch and roll whereby to indicate pitch and roll attitude of said aircraft, means including a pointer element variably positionable over said ground-simulating portion for indicating the position and attitude of said aircraft with respect to a predetermined ground track as a deflection of said pointer from said reference index, and means including motive means responsive to the position and attitude of said aircraft with respect to said ground track for actuating said pointer means, said pointer being rotatably positionable in accordance with the algebraic summation of roll and heading error and translationably positionable in accordance with the algebraic summation of heading error, heading error multiplied by pitch, and radio deviation of said aircraft with respect to said predetermined ground track.

8. A navigation instrument as claimed in claim 7 in which the horizon indicator includes a line of demarcation between said ground and sky portions, said sky portion comprising an opaque material and said ground portion comprising a transparent material.

9. A navigation instrument of the type claimed in claim 8 in which said ground track pointer is viewable through said transparent ground portion.

10. A navigation instrument for aircraft by means of which said aircraft may be controlled to approach and thereafter maintain a desired flight path comprising an instrument housing having a viewing opening in the front wall thereof, a reference index located substantially at the center of said opening, a horizon-simulating member viewable through said opening having a normally horizontal line thereon subdividing the same into sky and ground areas, means for stabilizing said member with respect to the roll and pitch axes of said aircraft, means including a pointer variably positionable over said ground area for indicating the position and attitude of said aircraft with respect to a predetermined ground track as a function of the deflection of said pointer from said reference index, and means responsive to the position and attitude of said aircraft with respect to said ground track for actuating said pointer means.

11. A navigation instrument for aircraft as claimed in claim 10 including azimuth and elevation pointers, and means for supporting said pointers in said housing for movement in directions to the right and left and upwardly and downwardly, respectively, across said opening relative to said index.

12. A navigation instrument for aircraft of the type claimed in claim 11 including a stabilized annular compass card disposed to rotate about said opening, a heading selector member settable relative to said compass card but otherwise movable therewith for indicating the bearing of a selected course relative to the heading of said craft and means for setting said member relative to said compass card.

13. A navigation instrument for aircraft as claimed in claim 11 including means responsive to azimuthal displacement from a radio beam, heading error and roll for controlling said azimuth pointer, and means responsive to elevational displacement from a radio beam and pitch for controlling said elevational pointer whereby said pointers are aligned with said reference index when the craft is on said flight path and also when the craft is off said flight path and its attitude is so adjusted to cause the craft to approach said flight path asymptotically.

14. A navigation instrument for aircraft comprising an instrument housing having a viewing opening in the front wall thereof, a stabilized annular compass card disposed to rotate within said opening, a heading selector member settable relative to said compass card but otherwise movable therewith for indicating the bearing of a selected course relative to the heading of said craft, means for setting said member relative to said compass card, a horizon indicator having sky-simulating and ground-simulating portions, means for stabilizing said horibon indicator in pitch and roll whereby to indicate pitch and roll attitude of said aircraft, a reference index, means including a pointer variably positionable over said ground-simulating portion for indicating the position of said aircraft with respect to a predetermined ground track as a deflection of said pointer from said reference index, and means responsive to the position of said aircraft with respect to said ground track for actuating said pointer.

15. A navigation instrument for aircraft of the type claimed in claim 14 wherein said pointer is stabilized as a function of roll and heading error.

16. A navigation instrument for aircraft of the type claimed in claim 15 wherein the means for actuating said pointer includes motive means actuated by the algebraic summation of signals which are functions respectively of heading error, heading error multiplied by the pitch, and radial deviation with respect to said ground track.

17. A navigation instrument for aircraft comprising an instrument housing having a viewing opening in the front wall thereof, a reference index localized substantially at the center of said opening, a stabilized annular compass card disposed to rotate within said opening, a heading selector member settable relative to said compass card but otherwise movable therewith for indicating the bearing of a selected ground track reltive to the heading of said craft, means for setting said member relative to said compass card, azimuth and elevation pointers, means for supporting said pointers in said housing for movement in directions to the right and left and upwardly and downwardly, respectively, across said opening relative to said index, means for controlling said pointers at least in part in accordance with the roll and pitch attitude of said craft, the heading error of said craft, and radio deviation from a selected ground track such that said pointers are aligned with said reference index not only when the craft is on said track but also when the craft is off said track and its roll and pitch attitude are so adjusted to cause the craft asymptotically to approach said track, a background means for said pointers including a member having a horizon-simulating surface disposed behind said pointers, means for supporting said member to rotate substantially about the center of said viewing opening as an axis and to move in directions substantially radially of said opening, said member being provided with a horizon line sub-dividing the same into sky and ground portions, means for stabilizing said member with respect to the roll and pitch axes of said aircraft, means including a ground track pointer variably positionable over said ground portion for indicating the position of said aircraft with respect to a predetermined ground track as a function of the deflection of said pointer from said reference index, and means responsive to the position of said aircraft with respect to said ground track for actuating said ground track pointer means.

18. A navigation instrument of the type claimed in claim 17 wherein said last mentioned means is responsive at least in part in accordance with the roll and a function of the pitch attitude of said craft, the heading error of said craft, and radio deviation from a selected ground track, whereby the azimuth and elevation pointers and the ground track pointer are aligned with said reference index when the craft is on said selected ground track.

19. A navigation instrument of the type claimed in claim 18 wherein said sky portion comprises an opaque material and said ground portion comprises a transparent material, the connection therebetween forming said horizon line.

20. A navigation instrument as claimed in claim 19 in which said ground track pointer is viewable through said transparent ground portion.

21. A navigation instrument for aircraft comprising a craft guidance indicator means for indicating to a pilot the attitude required to maintain or asymptotically approach a desired flight path, a stabilized annular compass card disposed to rotate about said guidance indicator means, a heading selector member settable relative to said compass card but otherwise movable therewith for indicating the bearing of a selected course relative to the heading of said craft, means for setting said member relative to said compass card, a horizon-simulating member having a normally horizontal line thereon sub-dividing the same into sky and ground areas stabilized with respect to the roll and pitch axes of said aircraft, means including a pointer variably positionable over said ground area for indicating the position of said aircraft with respect to a predetermined course, means responsive to the position of said aircraft with respect to said course for actuating said pointer means, and a common fixed reference index representing the fore and aft axis of said craft and forming a reference for said compass card, said craft guidance indicator means, said horizon-simulating member and said pointer means whereby when said craft is proceeding along said selected course, said heading selector, said craft guidance indicator means, said horizon-simulating member and said pointer means are aligned with respect to said common reference index.

22. An aircraft navigation instrument including a housing fixed to the craft having an opening therein comprising, a screen mounted adjacent said opening and having a horizon-defining line thereon, means for rotatably supporting said screen in said housing for rotation about the center of said opening as an axis, means for driving said rotatable supporting means in accordance with the roll attitude of the craft, means for supporting said screen on said rotatable supporting means for translational movement across said opening, rotatable means concentrically mounted with respect to said rotatable supporting means, means for driving said rotatable means in accordance with the pitch attitude of the craft, and means coupled between said rotatable means and said screen for driving said screen across said opening.

23. An aircraft navigation instrument including a housing fixed to the craft having an opening therein comprising, a screen mounted adjacent said opening and having a horizon-defining line thereon, a roll ring for rotatably supporting said screen in said housing for rotation about the center of said opening as an axis, means for driving said roll ring in accordance with the roll attitude of the craft, means for supporting said screen on said roll ring for translational movement across said opening, a pitch ring concentrically mounted with respect to said roll ring, means for driving said pitch ring in accordance with the pitch attitude of the craft, and means coupled between said pitch ring and said screen for driving said screen across said opening.

24. An aircraft navigation instrument as claimed in claim 23 wherein said last mentioned means includes differential means coupled between said roll ring driving means and said pitch ring driving means for compensating for the movement of said screen in pitch during roll maneuvers of said craft.

25. An aircraft navigation instrument as claimed in claim 24 wherein said compensating signal is applied to said pitch ring.

26. An aircraft navigation instrument as claimed in claim 25 wherein the horizon-defining line on said screen divides said screen into sky and ground portions, and means including a pointer variably positionably over said ground portion for indicating the position of said aircraft with respect to a predetermined ground track.

27. An aircraft navigation instrument as claimed in claim 26 including a reference index located substantially at the center of said opening.

28. An aircraft navigation instrument as claimed in claim 27 wherein said means for supporting said screen on said roll ring for translational movement across said opening includes a pair of spaced, parallel rollers having said screen positionably wound thereon.

29. An aircraft navigation instrument as claimed in claim 27 wherein said screen is divided into opaque and transparent portions comprising sky and ground portions, respectively, whereby the line of demarcation between said opaque and transparent portions define the horizon.

30. An artificial horizon instrument for aircraft adapted to provide an indication of the roll and pitch attitude thereof comprising, reference means including means for providing signals in accordance with the pitch and roll attitude of said craft, a roll ring rotatably positionable in accordance with said roll signals, a positionable screen having a horizon defining line thereon and mounted on said roll ring and rotatable therewith, a pitch ring concentrically mounted with respect to said roll ring and rotatably positionable in accordance with said pitch signals, and means responsive to rotation of said pitch ring for positioning said screen in translation.

31. An artificial horizon instrument for aircraft as claimed in claim 30 including a reference index whereby the roll and pitch attitude of said aircraft is viewed with respect to said reference index and means for compensating for the movement of said screen in pitch during roll maneuvers of said craft.

References Cited in the file of this patent

UNITED STATES PATENTS

| | | |
|---|---|---|
| 2,613,050 | Esval | Oct. 7, 1952 |
| 2,685,226 | Crane | Aug. 3, 1954 |